J. McMURTRY.
COTTON BALE HOOP.

No. 19,437. Patented Feb. 23, 1858.

UNITED STATES PATENT OFFICE.

JOHN McMURTRY, OF LEXINGTON, ASSIGNOR TO DANIEL WIEHL, OF FAYETTE COUNTY, KENTUCKY.

IMPROVEMENT IN COTTON-BALE HOOPS.

Specification forming part of Letters Patent No. 19,437, dated February 23, 1858.

*To all whom it may concern:*

Be it known that I, JOHN MCMURTRY, of Lexington, in the county of Fayette and State of Kentucky, have invented a new and useful Improvement in Cotton-Bale Hoops; and I do hereby declare that the following is a full, clear, and exact description of the same, reference being had to the accompanying drawings, forming part of this specification, in which—

Figure 1:
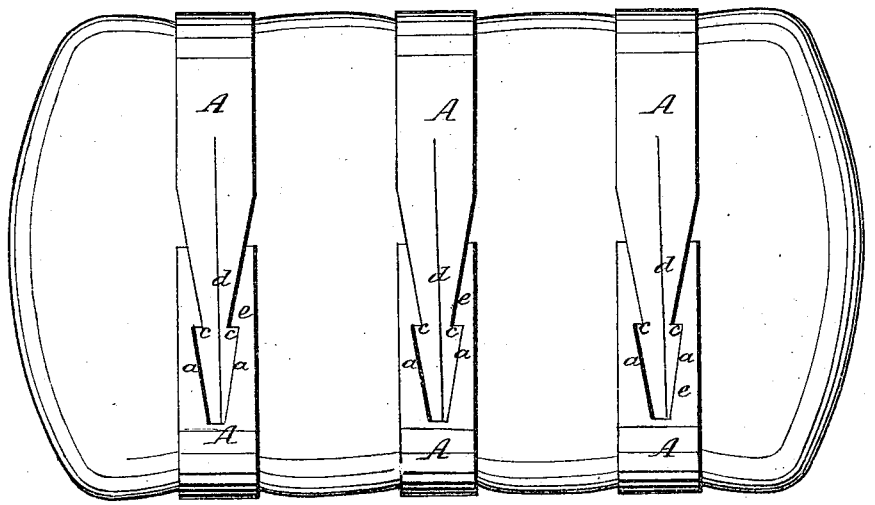
Figure 2:
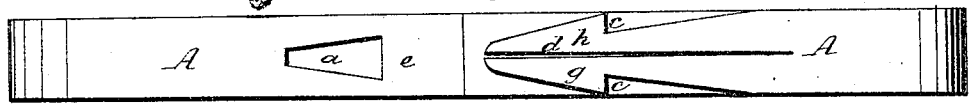
Figure 3:
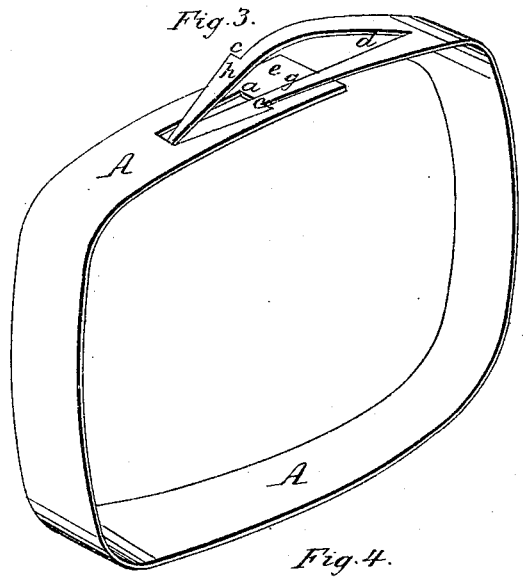
Figure 4:
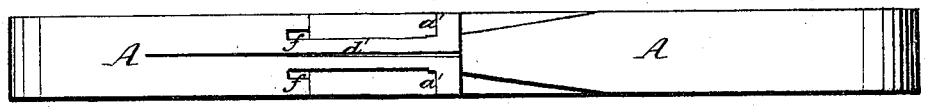

Figure 1 is a top view of a cotton bale put up with my improved hoops. Fig. 2 is a top view of one of the hoops unlocked. Fig. 3 is a perspective view of the same partly locked. Fig. 4 is a modification of the improved hoop.

Similar letters of reference in each of the several figures indicate corresponding parts.

It has long been a desideratum with the cotton planter and merchant to secure a hoop for baling cotton which would answer all the ends of the hemp cord, and yet be free from that destructive combustible nature, in case of the bale taking fire, possessed by it, and which, when the bale takes fire, facilitates its destruction instead of retarding it. Several plans of metal hoops have been patented and brought before the public of late, and while these go a great way toward answering the main end in view, and would, if adopted, retard the destruction of the cotton bale by fire, they are either too clumsy or defective in their locking to warrant and induce a universal abandonment of the combustible hemp cord and the substitution therefor of the metal hoop.

The nature of my invention consists in splitting one end of a cotton-bale hoop, so that it may be contracted or expanded in width as occasion may require, in order to effect the locking of the hoop round the bale without slack.

My invention also consists in the combination of the split and shouldered end of the cotton-bale hoop with the slotted end, in the manner presently described, for the purpose of effecting the locking of metal hoops round a cotton bale without riveting or allowing slack in the hoops.

To enable others skilled in the art to make and use my invention, I will proceed to describe its construction and operation more minutely.

I take the ordinary hoop-iron—say one inch wide—and form the hoop A, and then with suitable dies cut in one end of the hoop the taper slot $a$, Figs. 1, 2, and 3. I then, with another suitable die, form on the other end of the hoop the shoulders $c\,c$ and the slit $d$, Figs. 1, 2, and 3.

Instead of forming a slot in the end $e$, simply two shoulders, $a'\,a'$, may be formed on it, and two slots, $f\,f$, cut in the split end, one on each side of the slit, as shown in Fig. 4. The ends thus formed are ready for being locked together, which is effected as follows: The hoop, Figs. 1, 2, and 3, is placed around the bale and its ends brought together, and the part $g$ of the divided end is first inserted through the slot $a$ without bending, as illustrated in Fig. 3. The other part, $h$, is then bent to bow form and inserted, as shown in Fig. 3. The ends, when locked together, appear as shown in Fig. 1, the shoulders bearing against the forward or front side of the taper slot, and the parts $g\,h$ of the split end being caused to bear up against the inner circumference of the slotted end by the resistance of the cotton with which it comes in contact. The hoops, when locked round the bale, appear as shown in Fig. 1. If the hoop has two slots, $f\,f$, and a slit, $d$, at one end, as shown in Fig. 4, the parts of the divided end are forced apart and are twisted down so as to bring the slots nearly horizontal instead of vertical, and while in this position the parts of the divided end are slipped over the shoulders $a'\,a'$ and locked round the bale, as shown in Fig. 4.

What I claim as my invention, and desire to secure by Letters Patent, is—

1. Splitting one end of a cotton-bale hoop so that it may be contracted or expanded in width as may be required, in order to effect the locking of the hoop round the bale without slack, substantially as set forth.

2. The combination of the split and shoulder end of the cotton-bale hoop with the slotted end, in the manner described, and for the purpose set forth.

JNO. McMURTRY.

Witnesses:
W. W. ATO,
WM. SWIFT.